(12) United States Patent
Yoshimoto

(10) Patent No.: US 10,924,706 B2
(45) Date of Patent: Feb. 16, 2021

(54) AUDIO DEVICE

(71) Applicant: TEAC CORPORATION, Tokyo (JP)

(72) Inventor: Takuya Yoshimoto, Tokyo (JP)

(73) Assignee: TEAC CORPORATION, Tokyo (JP)

( * ) Notice: Subject to any disclaimer, the term of this patent is extended or adjusted under 35 U.S.C. 154(b) by 140 days.

(21) Appl. No.: 15/899,571

(22) Filed: Feb. 20, 2018

(65) Prior Publication Data

US 2018/0309956 A1    Oct. 25, 2018

(30) Foreign Application Priority Data

Apr. 24, 2017 (JP) .............................. JP2017-085015

(51) Int. Cl.
| | | |
|---|---|---|
| *H04N 7/14* | (2006.01) |
| *H04M 1/725* | (2006.01) |
| *H04M 1/60* | (2006.01) |
| *H04M 3/56* | (2006.01) |
| *H04M 3/42* | (2006.01) |
| *H04L 29/06* | (2006.01) |
| *H04M 1/247* | (2006.01) |
| *H04M 1/253* | (2006.01) |

(52) U.S. Cl.
CPC ............ *H04N 7/14* (2013.01); *H04L 65/4076* (2013.01); *H04M 1/2473* (2013.01); *H04M 1/6016* (2013.01); *H04M 1/72563* (2013.01); *H04M 3/42* (2013.01); *H04M 1/2535* (2013.01); *H04M 3/568* (2013.01); *H04M 2203/205* (2013.01)

(58) Field of Classification Search
CPC ...... H04N 7/14; H04M 3/42; H04M 1/72563; H04M 1/6016; H04M 1/2535; H04M 1/2473; H04M 3/568; H04M 2203/205; H04L 65/4076; G10L 13/04; G10L 21/003; H04R 3/12; H04R 2430/00
USPC ....................................................... 704/275
See application file for complete search history.

(56) References Cited

U.S. PATENT DOCUMENTS

| | | | |
|---|---|---|---|
| 2004/0101116 A1 | 5/2004 | Chida et al. | |
| 2005/0075098 A1 | 4/2005 | Lee et al. | |
| 2006/0069572 A1 | 3/2006 | Komata | |
| 2012/0155671 A1 | 6/2012 | Suzuki | |
| 2015/0026649 A1* | 1/2015 | Zhao ..................... G06F 1/3287 715/863 |

FOREIGN PATENT DOCUMENTS

| | | |
|---|---|---|
| CN | 1606241 A | 4/2005 |
| CN | 1622582 A | 6/2005 |
| CN | 201315621 Y | 9/2009 |

(Continued)

*Primary Examiner* — Thierry L Pham
(74) *Attorney, Agent, or Firm* — Seed IP Law Group LLP

(57) ABSTRACT

An audio device is provided which distributes via the Internet a telephone talk between a distributer and a viewer, with a simple structure. An audio interface device can be connected to a PC, and distributes via the Internet a sound signal which is input from a microphone along with a BGM by outputting the sound signal to the PC. When a call is made with a caller, the audio interface device branches the sound signal which is input from the microphone into a first sound signal and a second sound signal, and supplies the second sound signal to the caller. Also, the first sound signal, the sound signal from the caller, and the BGM are synthesized and output to the PC, and the telephone talk is distributed via the Internet.

8 Claims, 4 Drawing Sheets

(56) References Cited

FOREIGN PATENT DOCUMENTS

| CN | 106131583 A | | 11/2016 |
|---|---|---|---|
| CN | 106531177 A | | 3/2017 |
| JP | 2003-23504 A | | 1/2003 |
| JP | 2004-104490 A | | 4/2004 |
| JP | 2004-146894 A | | 5/2004 |
| JP | 2004146894 A | * | 5/2004 |
| JP | 2005-117630 A | | 4/2005 |
| JP | 2005-223403 A | | 8/2005 |
| JP | 2006-81051 A | | 3/2006 |
| JP | 2006-217187 A | | 8/2006 |
| JP | 2012-129800 A | | 7/2012 |
| KR | 10-2007-0076016 A | | 7/2007 |

* cited by examiner

AUDIO DEVICE

CROSS REFERENCE TO RELATED APPLICATION

The disclosure of Japanese Patent Application No. 2017-085015 filed on Apr. 24, 2017, including the specification, claims, drawings, and abstract, is incorporated herein by reference in its entirety.

TECHNICAL FIELD

The present disclosure relates to an audio device.

BACKGROUND

In the related art, there is known a technique for synthesizing and outputting various signals, including a call voice/sound.

JP 2003-023504 A describes a sound control method in a sound and video image communication system, and describes a technique in which, when a call sound for voice conversation is received during the time when a client terminal is receiving and outputting a video image and a sound for the video image, the sound for the video image and the call sound are synthesized and output.

JP 2004-146894 A describes a portable terminal device which can receive a broadcast wave such as that of the terrestrial digital broadcast or the like, and describes a technique in which a broadcast sound received by a broadcast wave receiver and a call sound received by a telephone communication unit are synthesized and output.

JP 2005-223403 A describes a line-type call system, and describes a technique in which, in a state where a call device having a sound recording medium in which sound data is recorded and another call device are call-connected, the sound data recorded in the sound recording medium is added to the sound transmitted from the other call device and the combined sound is output.

JP 2006-081051 A describes a terminal device which enables listening to a BGM during a call, and describes a technique in which the BGM and the call sound of the terminal device are mixed during a call and transmitted to the other party, and also, the BGM and the call sound from the other party are mixed and output to the speaker of the terminal device.

There is proposed a technique in which, for example, an audio interface device and a computer are connected to each other, various audio signals are captured from the audio interface and supplied to the computer, and the audio signals are suitably edited and recorded at the computer, or are output to the outside via the Internet (Internet live broadcasting). For example, a musical instrument performance or a song may be input from a microphone and broadcasted live via the Internet. As necessary, reverb may be applied, or the signal may be processed using an equalizer or a compressor, to achieve effective broadcasting. Further, a sound source may be connected to an external input terminal or the like, and the user may sing along the existing sound source, which can be broadcasted live via the Internet.

In such an Internet live broadcasting, in order to further gain the attention of the viewers, live broadcasting of a telephone talk between a distributer and a viewer, or of a talk between the distributer and an invited guest is also proposed. Normally, when the telephone talk between the distributer and the viewer is broadcasted live via the Internet, the sound of the distributer and the sound of the viewer are synthesized, and a part of the synthesized sound is branched and provided to the viewer when the synthesized sound is distributed via the Internet. However, in such a configuration, because the sound of the viewer loops, a special process has been necessary at the side of the computer which is responsible for the distribution.

SUMMARY

The present disclosure provides a technique which allows Internet distribution of a telephone talk between a distributer and a viewer with a simple structure.

According to one aspect of the present disclosure, there is provided an audio device which can be connected to a computer and which distributes via the Internet a sound signal which is input from a microphone by outputting the sound signal to the computer, the audio device comprising: a branching unit that branches, when a call is made with a caller, the sound signal which is input from the microphone into a first sound signal and a second sound signal, and supplies the second sound signal to the caller; an inputter that inputs a sound signal from the caller; and a synthesizer that synthesizes the first sound signal and the sound signal from the caller and outputs the synthesized signal to the computer.

According to another aspect of the present disclosure, the audio device further comprises a second inputter that inputs a reproduced audio signal from an external sound source, wherein the synthesizer synthesizes the first sound signal, the sound signal from the caller, and the reproduced audio signal, and outputs the synthesized signal to the computer.

According to another aspect of the present disclosure, the branching unit starts the branching when a call is received from the caller, and ends the branching when the call with the caller is completed.

According to another aspect of the present disclosure, the synthesizer applies an effect process on the sound signal from the caller, and then synthesizes the sound signals.

According to the present disclosure, when a call is made with the caller, the sound signal which is input from the microphone is branched to the first sound signal and the second sound signal, and the second sound signal is provided to the caller. On the other hand, the first sound signal and the sound signal of the caller are synthesized and output to the computer, and thus, Internet distribution of the talk with the caller can be enabled without the sound signal of the caller being looped.

BRIEF DESCRIPTION OF DRAWINGS

Embodiment(s) of the present disclosure will be described by reference to the following figures, wherein.

DESCRIPTION OF EMBODIMENTS

<Structure>

An embodiment of the present disclosure will now be described by reference to the drawings.

Figure 1:
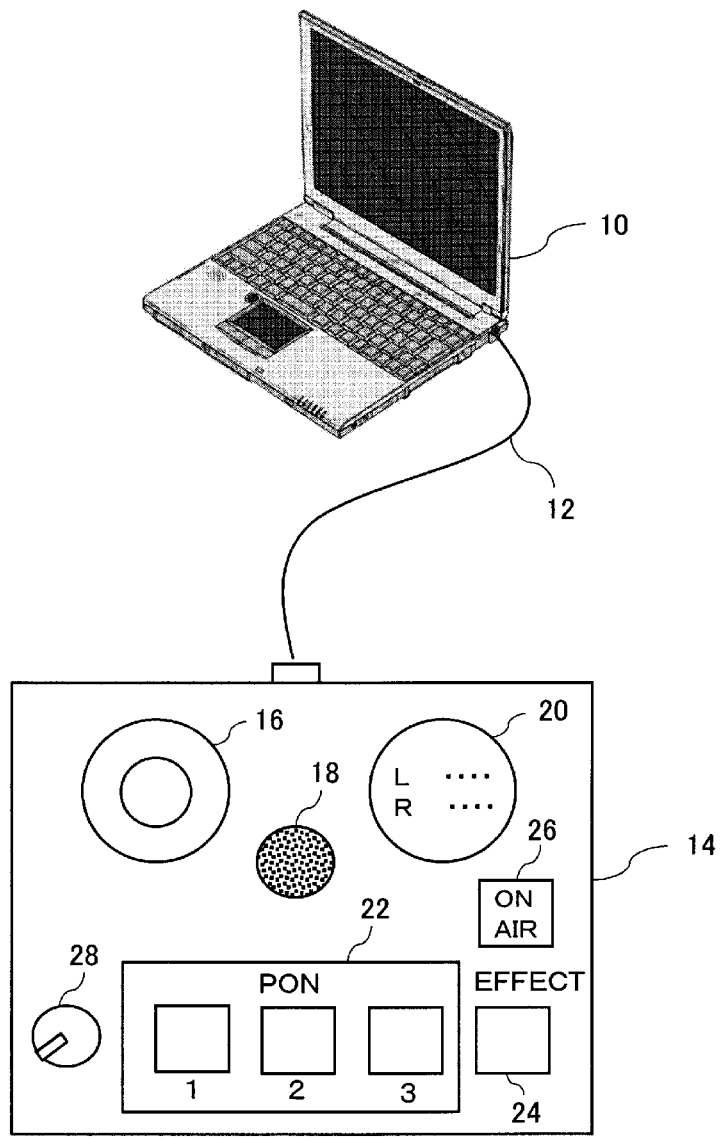
FIG. 1 is a system structural diagram in an embodiment of the present disclosure.

FIG. 1 is a system structural diagram of an embodiment of the present disclosure. An audio system including an audio device according to the present embodiment comprises a personal computer (PC) 10 and an audio interface device 14. The PC 10 and the audio interface device 14 are connected to each other, for example, by a USB cable 12, in a manner to allow mutual transmission and reception of data.

In the PC 10, software for inputting, editing, and outputting audio data are installed, and input, output, and editing of the audio data are executed using the software.

The audio interface device 14 functions as an audio device according to the present embodiment. The audio interface device 14 comprises an amplifier, and analog input terminals and analog output terminals of a plurality of channels, and transmits and receives an audio signal and various control signals to and from the PC 10. The audio interface device 14 comprises a microphone input terminal 16, a built-in microphone 18, a level meter 20, and a headphone output adjustment button 28, and further comprises an immediate output (PON) switch 22 comprising a plurality of buttons, an effect switch 24 which generates various sound effects, and an on-air switch 26.

The immediate output switch 22 comprises three immediate output switches including "immediate output 1," "immediate output 2," and "immediate output 3." When the user presses the immediate output switch 22, the audio interface device 14 supplies a reproduction and output command signal to the PC 10, and the PC 10 reproduces and outputs an audio signal according to the reproduction and output command signal. When the PC 10 is connected to the Internet and the audio signal reproduced by the PC 10 can be output to the outside via the Internet (Internet live broadcasting), with the user who is a distributer operating the immediate output switch 22 while the on-air switch 26 is in an ON state, the audio signal is reproduced and output to the Internet. Desired audio files may be assigned in advance to the three switches of the immediate output switch 22; that is, the "immediate output 1," the "immediate output 2," and the "immediate output 3." The user can press one of the three immediate output switches; that is, the "immediate output 1," the "immediate output 2," and the "immediate output 3," to control the PC 10 to reproduce and output the audio file which is assigned in advance.

The effect switch 24 is a switch for adding a predetermined sound effect to the audio signal. The predetermined sound effect may be arbitrary, and, for example, the process may be a process to add a reverb (reverberation sound).

The on-air switch 26 is a switch for instructing the PC 10 to output in real time via the Internet. By the user operating the on-air switch 26 to the ON state, for example, it becomes possible to output an audio signal, which is input from the microphone input terminal 16, or a sound signal which is input from the built-in microphone 18 from the PC 10 to the Internet, or to reproduce the audio file assigned in advance to the "immediate output 1" and to output to the Internet by the user operating the "immediate output 1." Further, by assigning an audio file of handclapping or of cheering voice, it becomes possible for the user who is the distributer to operate on the immediate output switch 22 and broadcast the handclapping or cheering similar to those in a television show.

Figure 2:
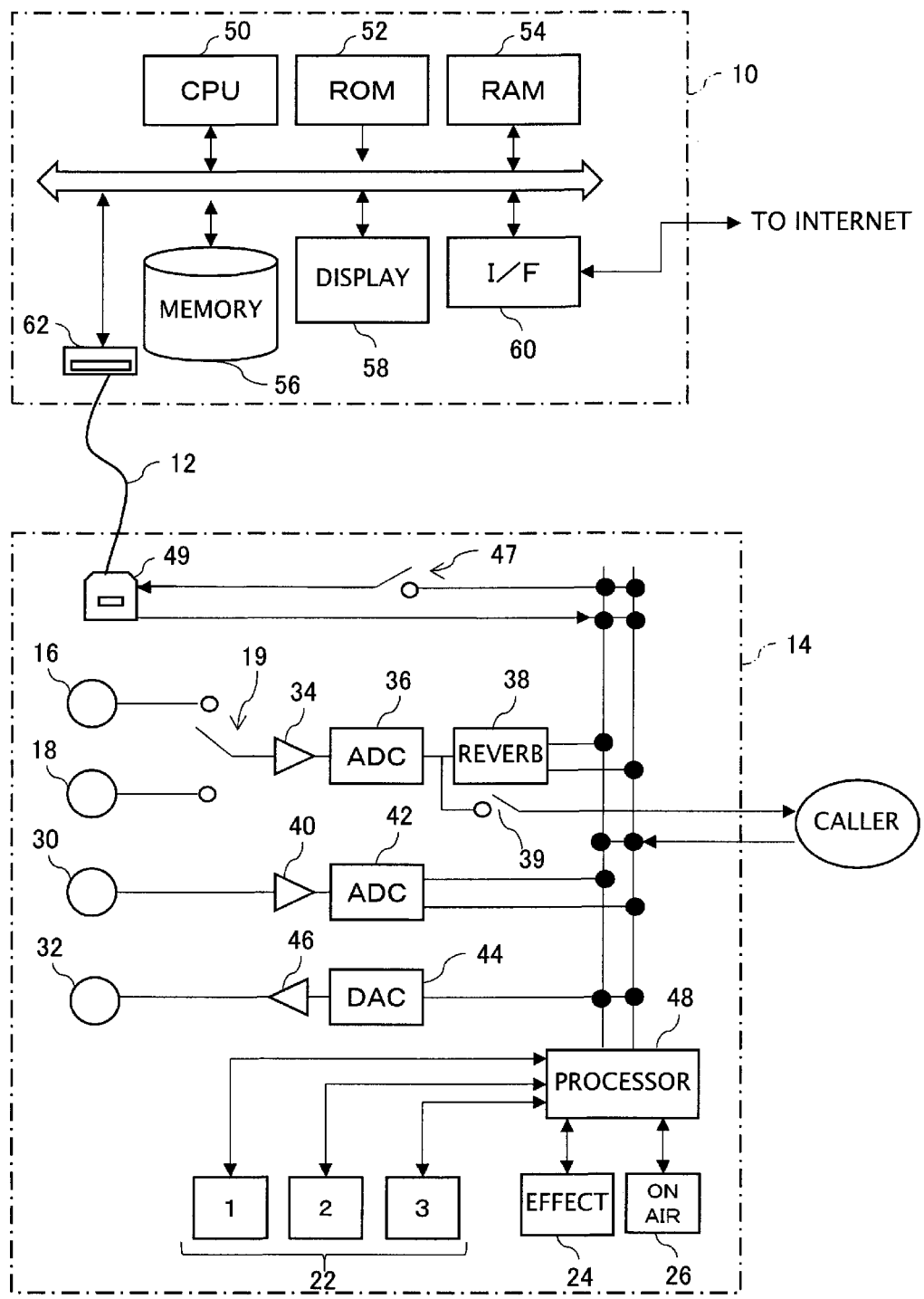
FIG. 2 is a structural block diagram in an embodiment of the present disclosure.

FIG. 2 is a structural block diagram of the audio system according to the present embodiment.

The PC 10 comprises a CPU 50, a ROM 52, a RAM 54, a memory 56, a display 58, a communication interface I/F 60, and a USB connector 62. In addition to these elements, the PC 10 comprises a known input/output interface such as a mouse, a keyboard, or the like.

The CPU 50 reads a processing program stored in the ROM 52 or in a hard disk drive, or the like, and realizes various functions of the present embodiment by executing the processing program using the RAM 54 as a working memory.

The memory 56 stores the audio file and other files. A format of the audio file is arbitrary, and is, for example, WAV or MP3. The other files are also arbitrary, and may be document data, image data, or video image data.

The display 58 displays various information based on a control command from the CPU 50. In the present embodiment, the display 58 displays virtual switches corresponding to the switches of the audio interface device 14; more specifically, the immediate output switch 22, the effect switch 24, and the on-air switch 26, to achieve a cooperative operation with the audio interface device 14.

The communication interface I/F 60 is an interface for connecting to the Internet serving as a communication line. The connection with the Internet may be wired or wireless.

The USB connector 62 is a connector for USB-connecting to the audio interface device 14. In the drawings, connection with a USB connector 49 on the side of the audio interface device 14 via the USB cable 12 is schematically shown.

The CPU 50 assigns audio files desired by the user to the three switches of the immediate output switch 22 in advance, according to a user operation. Specifically, the CPU 50 correlates one of the files stored in the memory 56 and one of the switches of the immediate output switch 22 according to the user operation. For example, the CPU 50 correlates an audio file of "AAA.WAV" stored in the memory 56 to the "immediate output 1," and an audio file of "BBB.WAV" to the "immediate output 2." Here, "correlation" specifically refers to a process of registering a path of the audio file to the "immediate output 1." The user may cause, for example, a list of files stored in the memory 56 to be displayed on the display 58, and may assign (correlate) a desired audio file to the immediate output switch by dropping an icon of the desired audio file to the virtual switch corresponding to immediate output switch 22 by a drag-and-drop operation or the like.

The CPU 50 also supplies data showing the assignment state to the USB-connected audio interface device 14. With this process, the assignment state is shared between the PC 10 and the audio interface device 14.

The audio interface device 14 comprises, in addition to the microphone input terminal 16, the built-in microphone 18, the immediate output switch 22, the effect switch 24, and the on-air switch 26 described above, an external input terminal 30, an output terminal 32, selection switches 19 and 47, amplifiers 34, 40, and 46, analog-to-digital converters (ADCs) 36 and 42, a digital-to-analog converter (DAC) 44, a reverb adder (REVERB) 38, and a processor 48.

Audio signals which are input from the microphone input terminal 16 and the built-in microphone 18 are selectively switched by the selection switch 19, and are converted into digital audio signals by the ADC 36 through the amplifier 34. To the digital audio signal, the reverb is suitably added by the reverb adder 38 according to an operation of the effect switch 24 by the user, and the digital audio signal is output to a stereo bus. An audio signal which is input from the external input terminal (AUX IN) 30 is converted into a digital audio signal by the ADC 42 through the amplifier 40, and is output to the stereo bus.

The audio signals which are input from the microphone input terminal 16, the built-in microphone 18, and the external input terminal 30, or the audio signals which are supplied from the PC 10 are converted into analog audio signals by the DAC 44 through the stereo bus, and are output from the output terminal 32 such as a headphone terminal or the like through the amplifier 46. A gain of the amplifier 46 is adjusted by the headphone output adjustment button 28.

The USB connector 49 for connecting to the PC 10 is connected to the stereo bus through the selection switch 47. The selection switch 47 cooperates with the on-air switch 26. When the on-air switch 26 is operated to the ON state, a connection point is switched ON, and the output of the audio signal from the audio interface device 14 to the PC 10 is started. On the other hand, regardless of the operation of the on-air switch 26, the control signal from the PC 10 to the audio interface device 14 is supplied to the processor 48.

The processor 48 controls operations of various parts of the audio interface device 14. The processor 48 controls the operations according to the operation signals from the immediate output switch 22, the effect switch 24, and the on-air switch 26. Specifically, the processor 48 outputs a reproduction command signal to the PC 10 in response to the operation signal from the immediate output switch 22. When the "immediate output 1" of the immediate output switch 22 is pressed, a reproduction command signal for the "immediate output 1" is output, when the "immediate output 2" is pressed, a reproduction command signal for the "immediate output 2" is output, and when the "immediate output 3" is pressed, a reproduction command signal for the "immediate output 3" is output. The reproduction command signal includes a level signal corresponding to the pressing force when the immediate output switch 22 is pressed. The level signal is a signal which controls the volume when the audio file is reproduced and output. For example, the pressing force may be categorized into two stages, and the sound may be output with a small volume when the pressing force is a weak pressing force and with a large volume when the pressing force is a strong pressing force.

When the CPU 50 of the PC 10 receives these reproduction command signals, the CPU 50 reproduces the audio file which is assigned to the "immediate output 1," the "immediate output 2," or the "immediate output 3" in advance, and outputs the audio file in a volume level corresponding to the pressing force. Further, the CPU 50 activates the reverb adder 38 to add the reverb in response to the operation signal from the effect switch 24. Moreover, the CPU 50 outputs a signal output start (broadcast start) command signal or a signal output stop (broadcast stop) command signal to the PC 10 in response to the operation signal from the on-air switch 26, and controls switching ON and OFF of the selection switch 47.

When the user who is the distributer is to distribute via the Internet the user's voice with the reproduced audio signal from the PC 10 as a BGM, the processor 48 synthesizes the reproduced audio signal from the PC 10 and the sound signal of the distributer which is input from the built-in microphone 18, and supplies the synthesized signal to the PC 10, and the synthesized signal is distributed from the PC 10 via the Internet.

On the other hand, when there is a call from the viewer of the Internet distribution through a portable phone line or the Internet line, and a talk is to be held over the telephone between the distributer and the viewer, there may be a demand to distribute the talk via the Internet.

In this case, in response to the operation of the user who is the distributer, the processor 48 switches the selection switch 39 ON, to branch the sound signal of the distributer which is input from the built-in microphone 18 into a first sound signal and a second sound signal, and supplies the second sound signal to the caller who is the viewer. The second sound signal of the distributer which is branched is converted into an analog signal and supplied to the caller through the portable phone line, or is supplied to the caller as a digital sound signal through the Internet line. The voice call via the Internet line is known through, for example, Skype or the like. The sound signal from the caller is converted into a digital signal and input to the audio interface device 14. The processor 48 synthesizes the first sound signal, among the sound signal of the distributer which is input from the built-in microphone 18, the reproduced audio signal from the PC 10, and the sound signal from the caller, supplies the synthesized signal to the PC 10, and distributes via the Internet from the PC 10. The processor 48 may switch the selection switch 39 ON in response to an operation signal from the on-air switch 26, or in response to an operation signal from another switch. The processor 48 may detect the reception of the call from the caller, may switch the selection switch 39 ON with the reception of the call as a trigger, may maintain the ON state during the call with the caller, and may switch the selection switch 39 OFF when the call is completed.

In the present embodiment, a configuration is employed in which the user who is the distributer inputs the user's voice from the built-in microphone 18, but alternatively, a configuration may be employed in which the user's voice is input from an external microphone and through the microphone input terminal 16 or the external input terminal 30.

In addition, in the present embodiment, the reproduced audio signal from the PC 10 is synthesized as the BGM with the sound signal of the user who is the distributer and the sound signal of the caller, but alternatively, a configuration may be employed in which an audio signal which is reproduced by a smartphone, a portable music player, or the like is input from the external input terminal, and the reproduced audio signal is synthesized as the BGM with the sound signal of the user who is the distributer and the sound signal of the caller.

<Flow of Signals>

Figure 3:
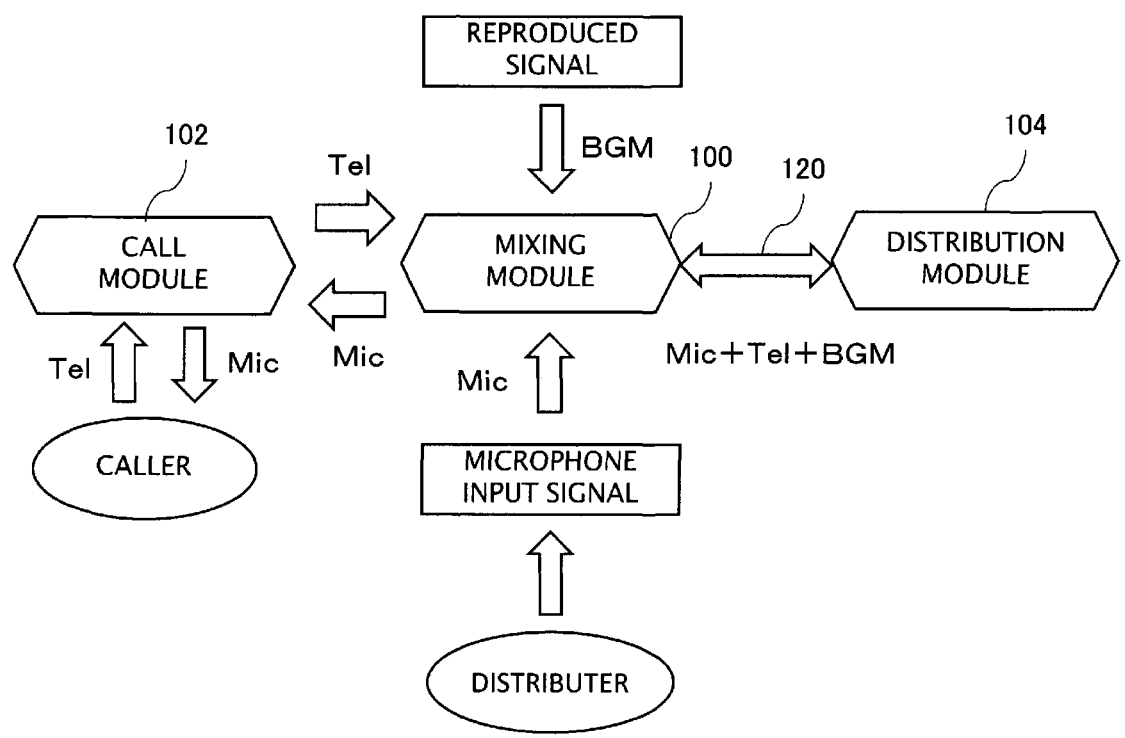
FIG. 3 is a schematic diagram showing a signal processing according to an embodiment of the present disclosure.

FIG. 3 schematically shows a flow of the signal processing in the present embodiment. Functions of the processor 48 of the audio interface device 14 will be described as a mixing module 100, functions to realize the voice call using the telephone line or the Internet line will be referred to as a call module 102, and functions of the CPU 50 of the PC 10 will be described as a distribution module 104.

Here, a "module" refers to components such as software or hardware that can be logically separated. Therefore, the module in the present embodiment not only refers to the module in a computer program, but also a module in a hardware structure. The module may correspond to the function in a one-to-one relationship. Alternatively, one module may be formed with one program, or a plurality of modules may be formed with one program. A plurality of modules may be executed by one processor, or by a plurality of processors in a distributed or parallel environment.

The user who is the distributer inputs the user's sound signal, for example, from the built-in microphone 18. The microphone input signal will be referred to as "Mic." The microphone input signal Mic is supplied to the mixing module 100.

The reproduced audio signal from the PC 10, the smartphone, the portable music player, or the like is supplied as the BGM to the mixing module 100.

The mixing module 100 branches a part of the microphone input signal Mic and supplies the same to the call module 102 when a call from the caller is received. The presence or absence of the call from the caller is judged, for example, using a call reception signal from the call module 102.

The call module 102 provides to the caller the microphone input signal Mic branched from the mixing module 100 (second sound signal). In addition, the sound signal of the caller is supplied to the call module 102. The sound signal from the caller will be referred to as "Tel." The call module 102 supplies the sound signal Tel from the caller to the mixing module 100 through the telephone line or the Internet line.

The mixing module 100 synthesizes the signal, among the microphone input signal Mic from the distributer, which is not branched to the call module 102 (first sound signal), the sound signal Tel from the call module 102, and the BGM from the PC 10 or the like, and transmits the same as (Mic+Tel+BGM) to the distribution module 104 of the PC 10 through a master bus 120 and the USB cable 12.

As is clear from FIG. 3, in the present embodiment, the mixing module 100 supplies only the microphone input signal Mic before the synthesis to the caller through the call module 102, and the present embodiment does not have a structure in which the synthesized signal is branched and supplied to the caller. Thus, the sound signal Tel from the caller does not loop. Therefore, the distributer does not need to execute a special process at the PC 10 or the like, and can distribute via the Internet the talk between the user and the caller along with the BGM, using the audio interface device 14.

<Process Flowchart>

Figure 4:
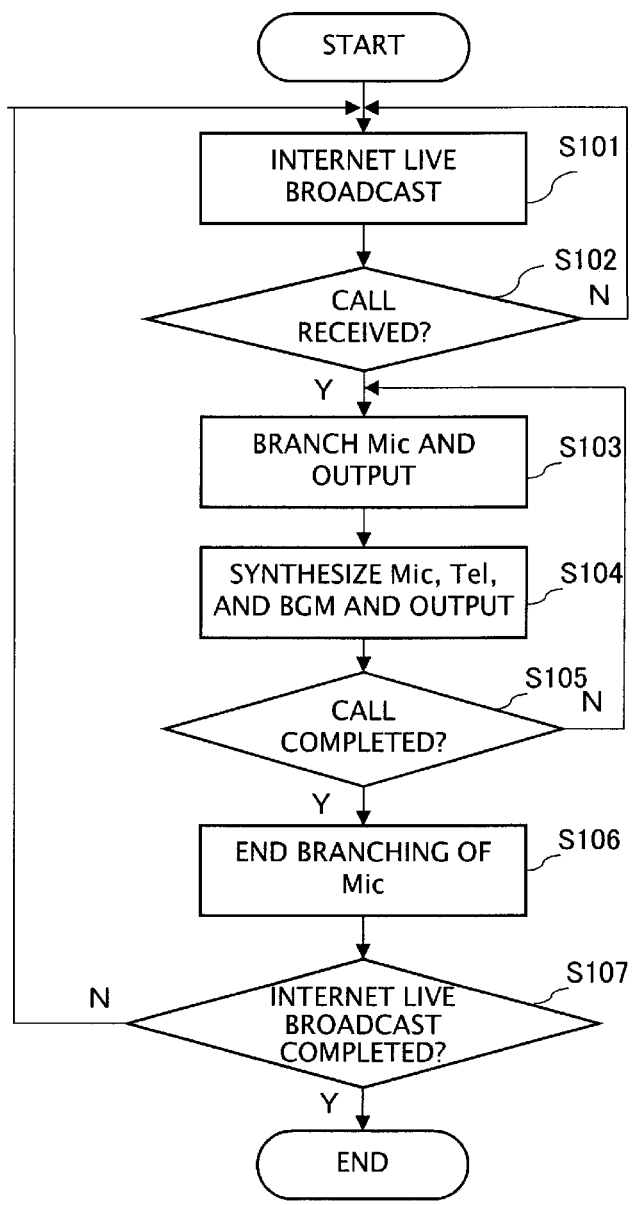
FIG. 4 is a process flowchart of an embodiment of the present disclosure.

FIG. 4 shows a process flowchart of the present embodiment.

First, the mixing module 100 of the audio interface device 14 and the distribution module 104 of the PC 10 execute the Internet live broadcasting in response to an operation of the on-air switch 26 by the user who is the distributer (S101). Specifically, the user who is the distributer inputs an audio signal of a musical instrument or the like from the external input terminal 30, or inputs a sound signal from the built-in microphone 18 or the like. The mixing module 100 synthesizes these audio signal/sound signal to the reproduced audio signal BGM reproduced by the PC 10 or the like, and supplies the synthesized signal to the distribution module 104. The distribution module 104 distributes the synthesized signal via the Internet.

Next, the mixing module 100 judges whether or not there is a call from the viewer or the like (S102). For example, when there is a call to the PC 10 by the Internet telephone such as Skype, the PC 10 detects the reception of the call, and notifies the mixing module 100 through the USB cable 12. When the processor 48 of the mixing module 100 receives the notification from the PC 10 and judges that there is a call (S102), the processor 48 switches the selection switch 39 from the OFF state to the ON state, to branch the microphone input signal Mic from the distributer, and to output the second sound signal to the call module 102 (S103). When the call module 102 is realized by the PC 10, the mixing module 100 supplies the branched microphone input signal Mic (second sound signal) to the PC 10. The call module 102 provides the microphone input signal Mic (second sound signal) to the caller. In addition, the call module 102 supplies the sound signal Tel from the caller to the mixing module 100. When the call module 102 is realized by the PC 10, the PC 10 supplies the sound signal Tel of the caller to the mixing module 100 through the USB cable 12. The mixing module 100 synthesizes a signal component, of the microphone input signal Mic, which is not branched to the call module 102 (first sound signal), the sound signal Tel of the caller, and the BGM, and outputs the synthesized signal to the distribution module 104 (S104). During the call between the distributer and the caller, the mixing module 100 continues to set the selection switch 39 in the ON state, to continue synthesizing the signal component which is not branched to the call module 102, the sound signal Tel of the caller, and the BGM, and outputting the synthesized signal to the distribution module 104 (NO in S105).

When the call between the distributer and the caller is completed (YES in S105), the mixing module 100 detects the completion of the call, switches the selection switch 39 from the ON state to the OFF state, and ends branching of the microphone input signal Mic (S106). Then, the processes of S102 to S106 are repeated until the Internet live broadcasting is completed (S107).

An embodiment of the present disclosure has been described. The present disclosure, however, is not limited to the embodiment, and various modifications may be made. Alternative configurations will now be described.

<Alternative Configuration 1>

In the embodiment, a case is described in which there is a single caller. Alternatively, there may exist a plurality of callers, and the mixing module 100 may synthesize sound signals Tel from a plurality of call origins with the microphone input signal Mic and the BGM, and may transmit the synthesized signal to the PC 10. The sound signal Tel may be a sound signal of a musical instrument played by the caller, and music performance sounds of a plurality of callers, including the distributer, may be synthesized and distributed via the Internet.

<Alternative Configuration 2>

In the embodiment, the PC 10 and the audio interface 14 are USB-connected by the USB cable 12. The form of connection is not limited to such a configuration, and may be wired or wireless. The devices may be connected through Wi-Fi (registered trademark) or Bluetooth (registered trademark).

<Alternative Configuration 3>

In the embodiment, the microphone input signal Mic, the sound signal Tel, and the BGM are synthesized and output by a software process by the processor 48 executing a program, but alternatively, these signals may be synthesized and output by a hardware process using a mixing circuit. For example, the synthesis and output may be realized using circuits such as an ASIC or an FPGA (Field Programmable Gate Array).

<Alternative Configuration 4>

In the embodiment, the mixing module 100 synthesizes the microphone input signal Mic, the sound signal Tel from the call origin, and the BGM, and transmits the synthesized signal to the PC 10, but alternatively, the BGM may be omitted when there is no BGM, and the microphone input signal Mic and the sound signal Tel from the call origin may be synthesized and the synthesized signal may be transmitted to the PC 10.

<Alternative Configuration 5>

In the embodiment, the mixing module 100 basically synthesizes the sound signal Tel from the caller without any processing applied thereto, to the microphone input signal Mic and the BGM, and the synthesized signal is output to the PC 10. Alternatively, an effect process may be applied to the sound signal Tel from the caller, and the synthesis may be executed after the sound of the caller is processed (voice changed). Further, when the microphone input signal Mic, the sound signal Tel of the caller, and the BGM are synthesized, the synthesis levels of the signals may be adjusted (increased or reduced) for the synthesis. When synthesizing the signals, it is desirable that both the microphone input signal Mic and the sound signal Tel of the caller are treated as a monaural signals, which enables distribution via the Internet of a call conversation in a more natural manner.

The invention claimed is:

1. An audio device comprising:
a connector configured to electrically connect the audio device and a computer;
a processor coupled to the connector; and
a memory storing instructions that, when executed by the processor, cause the audio device to:
input a sound signal from a microphone;
during a call with a caller, branch the sound signal input from the microphone into a first sound signal and a second sound signal;
during the call with the caller, supply the second sound signal to the caller;
during the call with the caller, input a sound signal from the caller; and
during the call with the caller, synthesize the first sound signal and the sound signal from the caller; and
during the call with the caller, output a synthesized signal that results from synthesizing the first sound signal and the sound signal input from the caller to the computer via the connector.

2. The audio device according to claim 1, wherein the instructions, when executed by the processor, cause the audio device to:
during the call with the caller, input a reproduced audio signal from an external sound source;
during the call with the caller, synthesize the first sound signal, the sound signal from the caller, and the reproduced audio signal; and
during the call with the caller, output a synthesized signal that results from synthesizing the first sound signal, the sound signal from the caller, and the reproduced audio signal to the computer via the connector.

3. The audio device according to claim 1, wherein the instructions, when executed by the processor, cause the audio device to:
start branching the sound signal input from the microphone into the first sound signal and the second sound signal, when the call with the caller is started; and
end the branching of the sound signal input from the microphone into the first sound signal and the second sound signal, when the call with the caller is completed.

4. The audio device according to claim 1, wherein the instructions, when executed by the processor, cause the audio device to:
apply an effect process on the sound signal from the caller, and then synthesize the first sound signal and the sound signal from the caller to which the effect process is applied.

5. The audio device according to claim 1, wherein the connector is configured to electrically connect the audio device and the computer via a cable.

6. The audio device according to claim 5, wherein the connector is a Universal Serial Bus (USB) connector.

7. The audio device according to claim 1, wherein the connector is configured to wirelessly connect the audio device and the computer.

8. The audio device according to claim 1, wherein the instructions, when executed by the processor, cause the audio device to output a command to the computer via the connector, the command being configured to cause the computer to output the synthesized signal that results from synthesizing the first sound signal and the sound signal input from the caller to a network during the call with the caller.

* * * * *